United States Patent [19]

Minucciani et al.

[11] Patent Number: 4,534,006
[45] Date of Patent: Aug. 6, 1985

[54] OPERATING ARM UNIT CONTROLLED BY A COMPUTER SYSTEM

[75] Inventors: Giorgio Minucciani, Moncalieri; Domenico Sola, Turin, both of Italy

[73] Assignee: D.E.A. Digital Electronic Automation S.p.A., Turin, Italy

[21] Appl. No.: 330,650

[22] Filed: Dec. 14, 1981

[30] Foreign Application Priority Data

May 15, 1981 [IT] Italy .................. 67647 A/81

[51] Int. Cl.³ .................................... G05B 13/00
[52] U.S. Cl. .................................... 364/513; 318/568; 901/16; 901/37; 901/7
[58] Field of Search ........ 318/568; 364/513, 131–136, 364/474; 414/589, 590, 730, 749, 750, 751; 901/2–8, 31, 37, 39

[56] References Cited

U.S. PATENT DOCUMENTS

| 3,144,947 | 8/1964 | Pittwood | 901/37 X |
|---|---|---|---|
| 3,255,893 | 7/1966 | Hainer et al. | 901/21 X |
| 3,343,864 | 9/1967 | Baer | 901/37 X |
| 3,640,564 | 2/1972 | Kuster | 901/37 X |
| 3,727,119 | 4/1973 | Stanley et al. | 318/568 |
| 3,890,552 | 6/1975 | Devol et al. | 901/8 X |
| 3,909,600 | 9/1975 | Hohn | 364/513 |
| 4,074,067 | 2/1978 | Speckhard | 364/200 |
| 4,132,318 | 1/1979 | Wang et al. | 414/618 |
| 4,149,235 | 4/1979 | Froyd et al. | 364/136 X |
| 4,219,171 | 8/1980 | Rudmann | 901/39 X |
| 4,228,495 | 10/1980 | Bernhard et al. | 364/136 |
| 4,229,136 | 10/1980 | Panissidi | 414/730 |
| 4,262,336 | 4/1981 | Pritchard | 364/474 |
| 4,274,801 | 6/1981 | Herb et al. | 414/749 |
| 4,300,198 | 11/1981 | Davini | 414/719 |
| 4,379,335 | 4/1983 | Kirsh et al. | 364/513 |
| 4,415,286 | 11/1983 | Jennings | 400/279 |

Primary Examiner—Joseph F. Ruggiero
Assistant Examiner—Allen MacDonald
Attorney, Agent, or Firm—Gifford, VanOphem, Sheridan, Sprinkle & Nabozny

[57] ABSTRACT

The present invention provides a computer controlled robotic arm unit having a fixed body and a carriage which is linearly movable to the fixed body along a first horizontal orthogonal cartesian axis. An elongated column is vertically movably mounted to the carriage along a second vertical cartesian axis while an elongated arm is carried at the upper end of the column. This arm includes a work performing member at one end and is linearly movable along a third and substantially horizontal orthogonal cartesian axis which is perpendicular to the first axis.

19 Claims, 20 Drawing Figures

OPERATING ARM UNIT CONTROLLED BY A COMPUTER SYSTEM

BACKGROUND OF THE INVENTION

The present invention relates to an operating arm unit (robot) controlled by a computer system. This arm has a gripping or measuring end which can conveniently be used to perform an assembly operation or a working stage, or else can be used for sensing dimensional measurements.

Operating arm units (robots) so far developed for the purpose of automating manually performed operations have been made with a structure which substantially copies the movement of the human arm. This involves a rather complicated and expensive structure.

Moreover, because the component elements of such arms do not have a modular nature, and because of the idea on which they are based, of substituting them for the human arm without their having the senses of the human arm, the results up to now have often been disappointing in terms of reliability and the ability to operate in real time.

SUMMARY OF THE INVENTION

The object of the present invention is, therefore, that of providing an operating arm unit controlled by a computer, which will overcome the above indicated limits of units developed until now, and which will thus have, in particular, a high flexibility in the configuration of the structure and a convenient adaptability to any specific application, which can be easily mounted in the most convenient working region, which will have operating adaptability to critical or anomalous situations deriving, for example, from limited variations in dimensions, form and alignment, and which will be programmable.

According to the present invention there is provided an operating arm unit controlled by a computer system, the said arm comprising a support structure for a gripping or measuring end, characterized by the fact that the said structure includes a single body for supporting and guiding a single column, the said body being movable with respect to a support element for the said arm, the said support element being fixable on a fixed body, the said support structure including rectilinear displacement means for the said end with respect to the said support element along the directions of a group of three orthogonal cartesian axes.

BRIEF DESCRIPTION OF THE DRAWINGS

For a better understanding of the present invention there will now be given, by way of non-limitative example, a description of one embodiment, with reference to the attached drawings, in which.

DETAILED DESCRIPTION OF THE INVENTION

Figure 1:
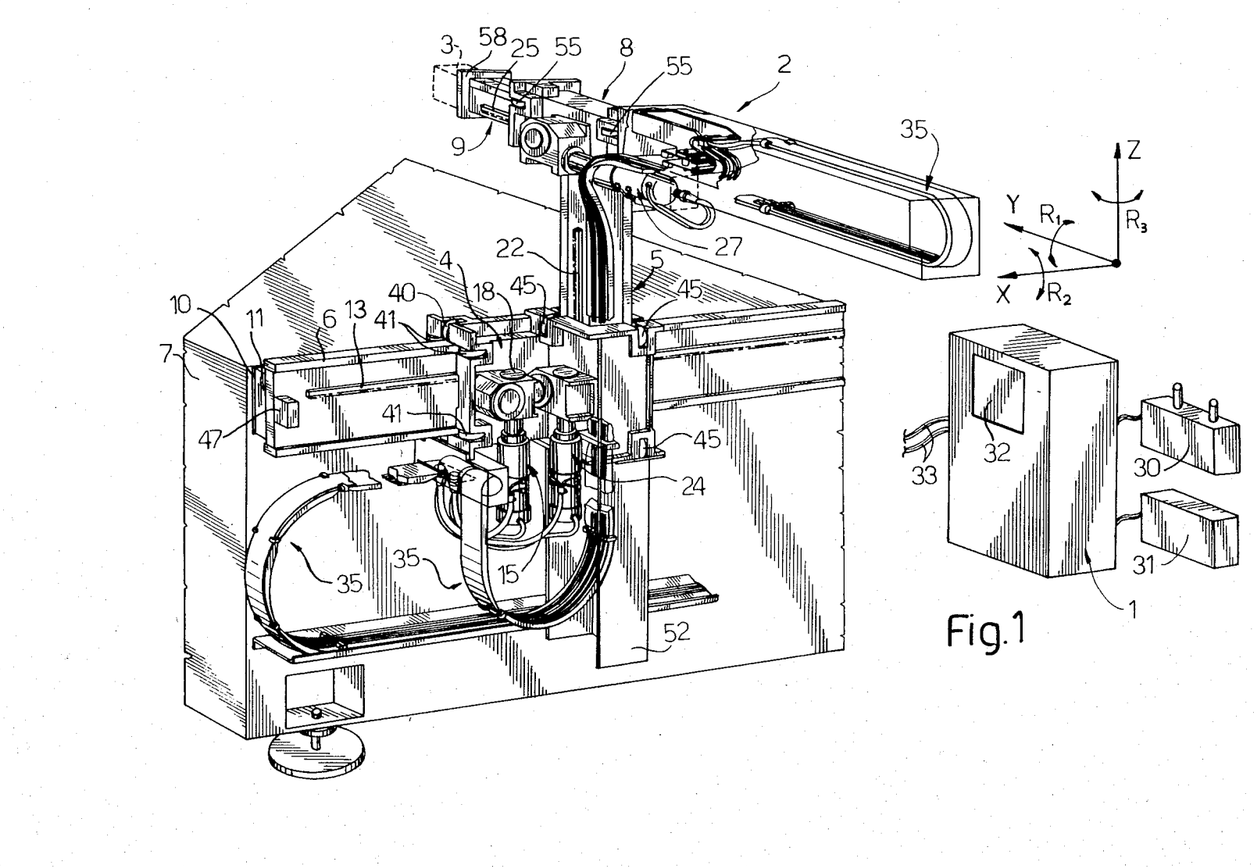
FIG. 1 is a perspective view of a unit formed according to the principles of the present invention.

With reference to FIG. 1, the unit according to the present invention is controlled by a computer system 1 and comprises an arm structure 2 for support of an end head 3 (indicated in broken outline) which may be a gripper or a measuring head. The structure 2 includes a single carriage 4 for supporting a single vertical column 5, and the carriage 4 is slidable along the axis of a support element 6 which is fixed to one side of a fixed bed 7. The column 5, which is slidable along its own axis, carries at its top a carriage 8 which serves to support and guide a single horizontal column 9 which carries the end head 3. This head 3 can be displaced along the directions (x,y,z) of a group of three orthogonal cartesian axes by means of the carriages 4 and 8, the axes being parallel to the axis of the support element 6, to the axis of the horzontal column 9 and to the axis of the vertical column 5 respectively. On the structure 2, as will be described further below, there can be provided three further rotary articulations for turning the head 3 in three directions of rotation indicated $R_1, R_2$ and $R_3$, respectively about the axes y,x and z, only two of which can conveniently be provided simultaneously, to bring the arm up to the maximum configuration normally provided of five axes (three linear and two rotary).

Figure 2:
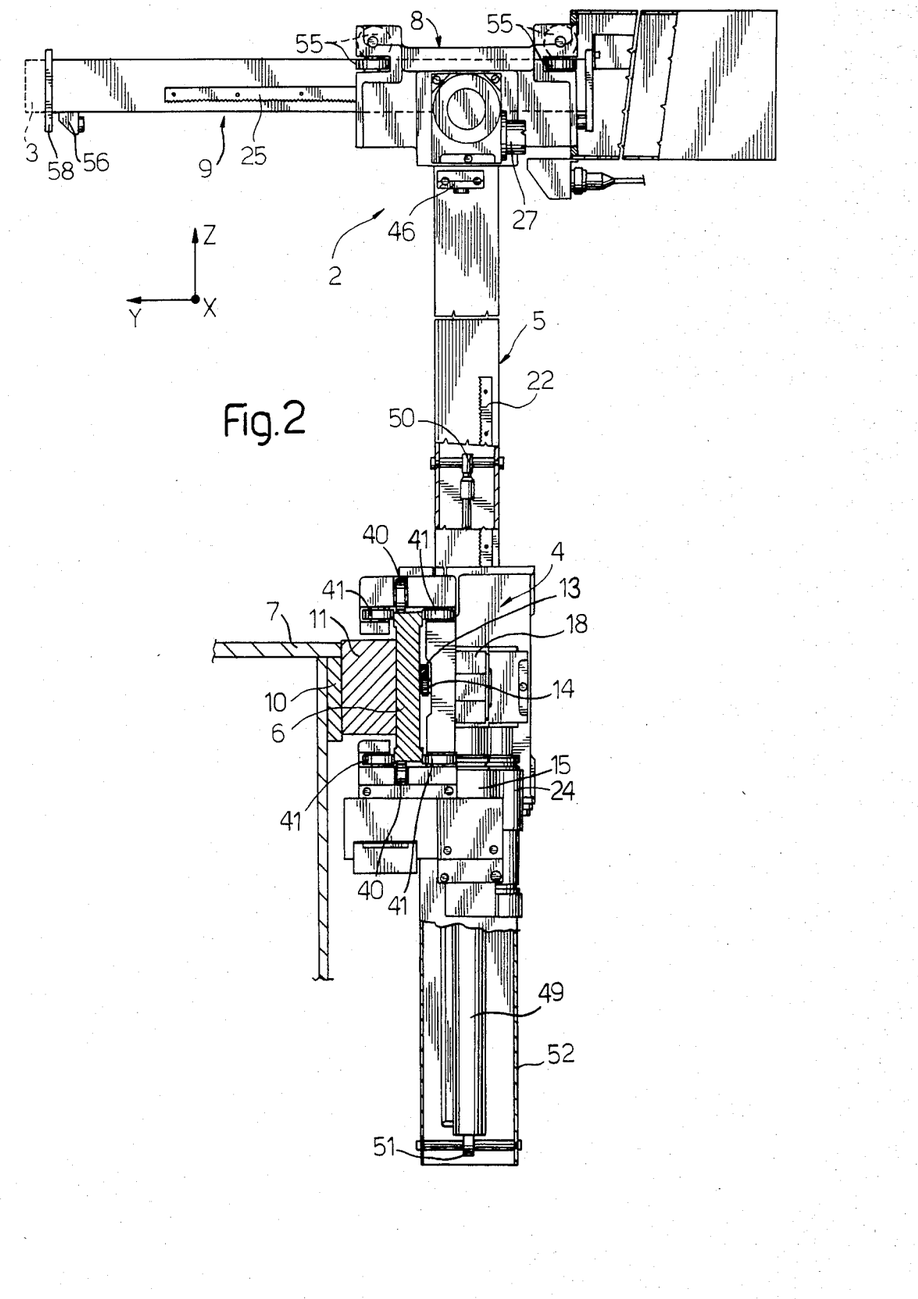
FIGS. 2 and 3 are partially sectioned partial views, at 90° with respect to one another, of the operating arm of FIG. 1.
Figures 3, 4:
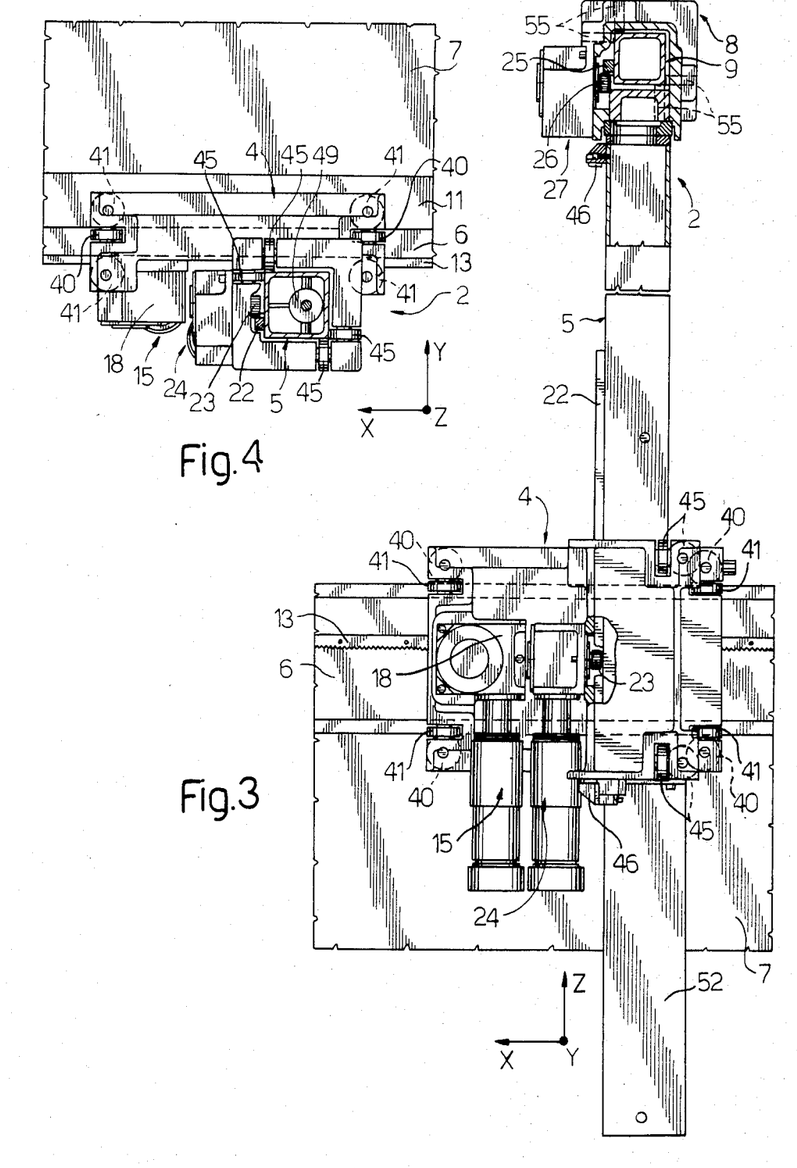
FIG. 4 is a partially sectioned view from above of the arm of FIG. 1.

With reference also to FIGS. 2, 3 and 4, the support element 6 is in the form of an I section beam and is mounted vertically and fixed to a plate 10 connected to the bed 7 by means of a spacer block 11.

On the side of the element 6 there is fixed a rack 13 with which meshes a pinion 14 driven from the output of a motor unit 15 fixed to the carriage 4, for moving the carriage 4 itself along the element 6. The motor unit 15 includes a d.c. motor 16 (FIG. 19). with an incorporated tachometric dynamo 17. The shaft of the motor 16 is connected to the pinion 14 by means of a reduction gearbox 18 of the worm gear type. The detection of the position of the carriage 4 along the element 6 is effected with an optical "encoder" 20 (FIG. 19) of the incremental type having (known) reference notches, and is keyed directly to the motor 16 using the shaft, passing therethrough, for driving and centering. The carriage 4 also constitutes a guide for the vertical column 5 along one side of which there is fixed a rack 22 with which meshes a pinion 23 of a motor unit 24 similar to the motor unit 15 and fixed to the carriage 4.

Along one side of the horizontal column 9 there is fixed a rack 25 with which meshes a pinion 26 of a motor unit 27 similar to the motor unit 15 and fixed to the carriage 8.

To the computer 1 there is connected a box 30 for the manual control of the movement of the head 3, and a video keyboard 31, and the computer 1 carries a control panel 32. This computer 1 is connected to the structure 2 by means of connection cables 33 which are only partly shown. The electrical connections to the various motor units 15,24,27 and to the other component elements of the arm are formed with flat strips 35 which can be folded a large number of times and which comprise a plurality of electrical conductors lying alongside one another for isolating the current, and which are utilized only in alternate steps for reciprocal screening. On these strips 35 there can conveniently be fixed compressed air ducts leading to actuator elements of the arm 2.

With reference to FIG. 2 the support and guide element 6 for the movement of the arm 2 along the x-axis is formed from hardened steel which is ground on the sliding tracks for the carriage 4; it has a relatively deep section and can have a length such as to achieve the maximum desired path along the x-axis.

The carriage 4 is conveniently formed of cast aluminium and is integral with the part for guiding the vertical column 5 along the z-axis. This carriage 4 is mounted astride the element 6 and carries two pairs of support rollers 40 disposed with their axes horizontal above and below the element 6, and four pairs of guide rollers 41 disposed with their axes vertical at the top and bottom of the element 6.

The vertical column 5 for the movement of the head 3 along the z-axis passes through the carriage 4 which serves to support and guide it. This column 5 is formed from a square section steel tube having hardened and ground tracks for sliding within the carriage 4. This carriage 4 carries, in fact, at its top and bottom, two sets of four rollers 45 arranged perpendicularly with respect to the surfaces of the column 5 and in pairs adjacent opposite corners thereof. On the column 5 there are fixed two z-axis end position buffers 46. Two buffers 47 (only one of which can be seen) defining the end positions along the x-axis are fixed to the ends of the support element 6. Within the column 5 there is positioned a counter balancing cylinder 49 (of known type) for avoiding the creation of excessively high couples in operation of the motor unit 24. This cylinder 49 is a single acting cylinder and the shaft is connected at the top to the column 5 with a self aligning coupling 50, while the body is connected by a coupling 51 to a channel 52 fixed to the underside of the carriage 4. This, therefore, constitutes a pneumatic spring controlled by a pressure regulator in such a way as to maintain constant the load on the motor unit 24 during the movement of the cylinder; the discharge of the regulator is eliminated and the value of the pressure is maintained constant with a balancing plenum chamber having a volume one hundred times that of the cylinder. The cables and tubes for the movement along the y-axis and for other components of the arm 2 are also housed within the column 5. The carriage 8, which is fixed to the top of the column 5 serves as a support and guide for the horizontal column 9 which moves along the y-axis.

The carriage 8 is also made of cast aluminium and the beam 9 is also formed from a square section steel tube having hardened and ground tracks for sliding within the carriage 8. The carriage 8 in fact carries, above and below, near the opposite corners of the column 9, two sets of four rollers 55 arranged perpendicularly with respect to the surfaces of the column 9 itself. Also provided on the column 9 there are two buffers 56 defining the ends of the path along the y-axis. A standard flange 58 is positioned at the end of the column 9 for the mounting of convenient members, which may be gripper members, measurement members, force sensing members, all having axis of rotation as will be described in more detail below.

Figure 5:
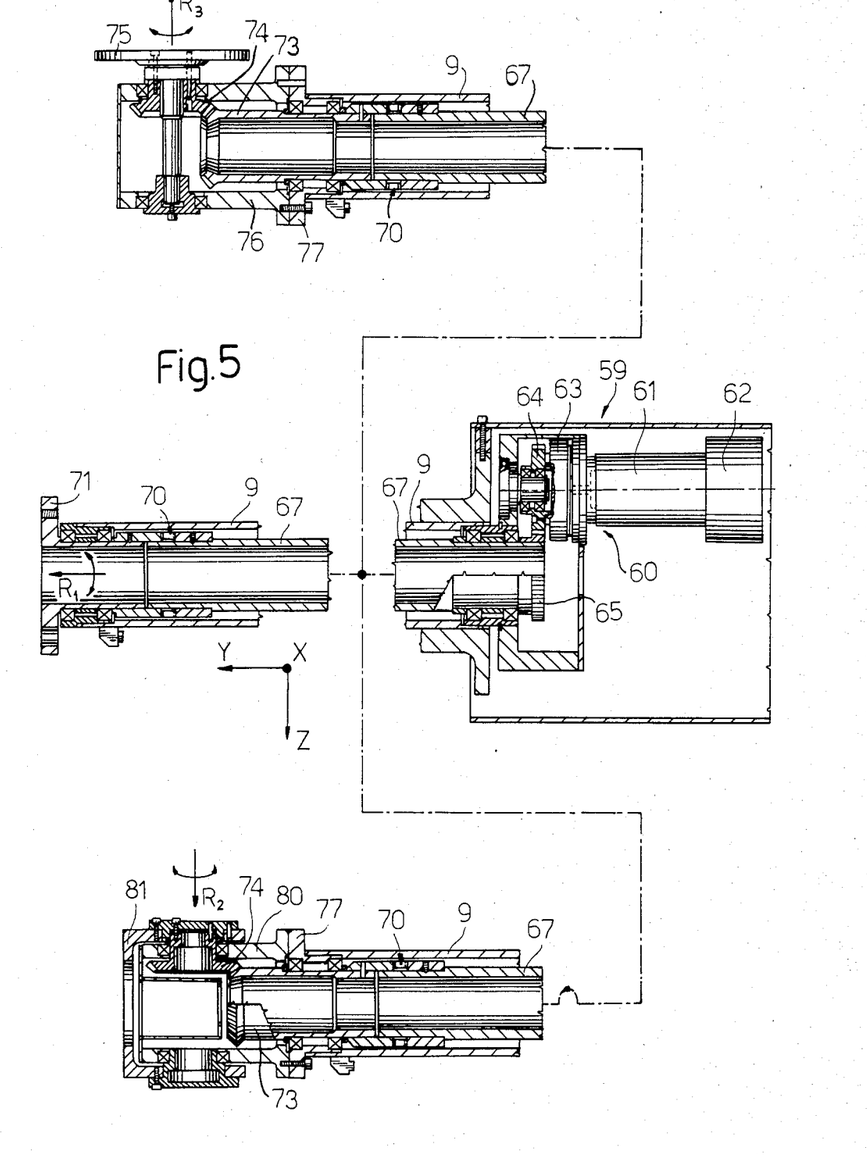
FIG. 5 is a sectioned view of some end parts for the arm of FIG. 1, in three alternative assembly arrangements.

FIG. 5 illustrates how the rotations $R_1, R_2$ and $R_3$ of the head 3 are obtained. In fact, to the rear part of the horizontal column 9 there is connected a box 59 which contains a motor unit 60 which includes (with reference to FIG. 19) a d.c. motor 61 and an incremental optical encoder 62 keyed to the shaft of the motor 61. This motor 61 drives a reduction gearbox unit 63 of the "harmonic drive" type which drives a toothed wheel 65 which meshes with a toothed wheel 65 which is fixed to the rear of a sleeve 67 mounted at the ends thereof on ball bearings and extending throughout the length of the column 9, and through which pass the various indicating and control connections for the head 3. In the central part of FIG. 5 there is illustrated the arrangement for obtaining the rotation $R_1$. At the end of the sleeve 67 there is in fact connected a standard attachment flange 71 coupled by means of a sleeve coupling 70 which provides a straight through coupling; the flange is controlled by the motor unit 60 to perform the rotation $R_1$. In the upper part of FIG. 5 there is illustrated an alternative mounting arrangement for obtaining, still with the motor unit 60, the rotation $R_3$ instead of the rotation $R_1$. Instead of the attachment flange 71, a bevel pinion 73 which meshes with a bevel gear 74 is connected to the coupling 70. The bevel gear 74 is rigidly connected to a coaxial plate 75 perpendicular to the said axis. The unit comprising the wheel 74 and plate 75 is mounted by bearings on a support body 76 which is secured to an end flange 77 of the column 9. Therefore the rotation of the motor unit 60 causes the rotation of the sleeve 67, the coupling 70, the pinion 73, the gear wheel 74 and the plate 75, the latter of which performs the rotation $R_3$.

In the lower part of FIG. 5 there is illustrated a further alternative mounting arrangement, this being shown at 90° with respect to the preceding arrangement, for obtaining the rotation $R_2$ still by means of the motor unit 60. To the bevel wheel 74, which is mounted by means of bearings on a fixed fork 80 fixed to the end flange 77 of the column 9 there is secured a movable fork 81 which, therefore, driven by the motor unit 60 and with the consequent rotation of the bevel wheel 74 describes the rotation $R_2$.

Figure 6:
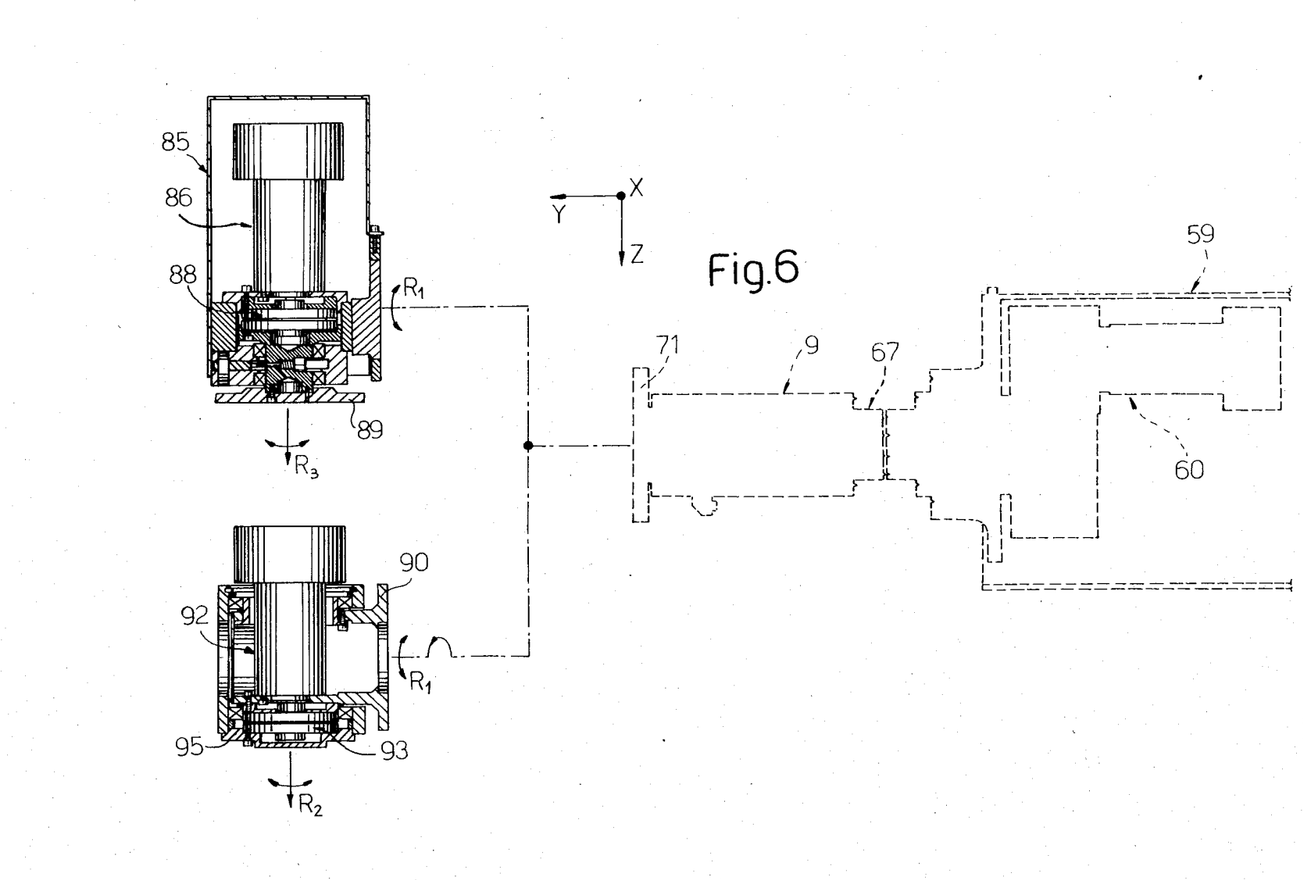
FIG. 6 is a sectioned view of an end part of the arm of FIG. 1, in two alternative assembly arrangements.

In FIG. 6 there are illustrated two assembly variations which make it possible to have a combination of two rotations, that is to say $R_1$ and $R_3$ or else $R_1$ and $R_2$. The first combination, illustrated in the upper part, includes the arrangement (in broken outline) illustrated in the central part of FIG. 5, with which the rotation $R_1$ of the flange 71 is obtained from the motor unit 60, and to this flange 71 there is fixed a box 85 which includes within it a motor unit 86 similar to the motor unit 60 and the axis of which lies along the z-axis. To the output shaft of the motor unit 86 there is connected, by means of a reduction gearbox 88 of the "harmonic drive" type, an attachment flange 89 which, therefore, describes the rotation $R_3$ when driven by the motor unit 86. The box 85 further describes the rotation $R_1$ when driven by the motor unit 60.

Figure 7:
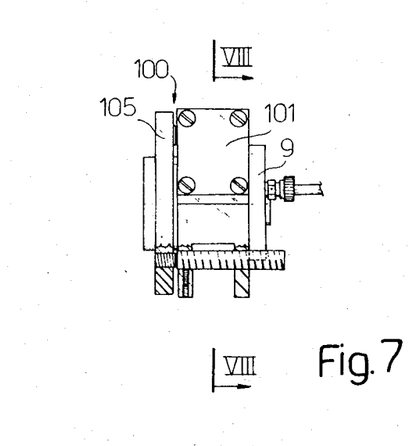
FIG. 7 is a sectioned view of a different embodiment of the end part of the arm of FIG. 1.
Figure 8:
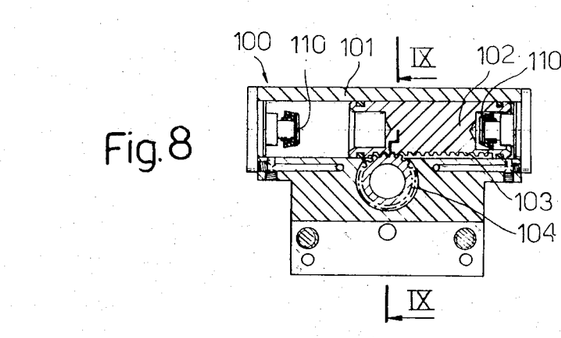
FIG. 8 is a sectioned view taken on the line VIII—VIII of the part of FIG. 7.
Figure 9:
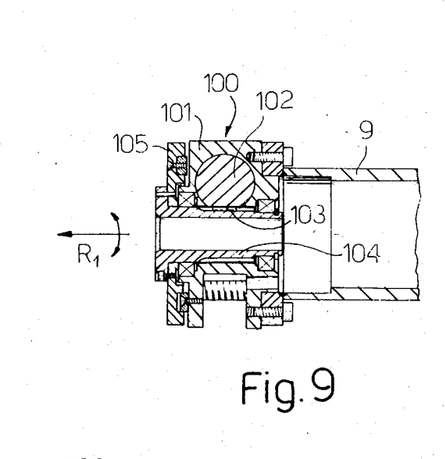
FIG. 9 is a sectioned view taken on the line IX—IX of the part of FIG. 8.

In the lower region of FIG. 6 there is illustrated a fixed fork 90 which is connected to the flange 71 and which carries a motor unit 82 similar to the motor unit 86. By means of a reduction gearbox 93, similar to the reduction gearbox 88, the motor unit 92, which is positioned along the x-axis, controls the $R_2$ rotation of a movable fork 95 which is carried by bearings on the fixed fork 90. The control of the rotations $R_1$, $R_2$ and $R_3$, rather than by means of electrically controlled motor units as has been described, could be obtained by pneumatic control. With reference to FIGS. 7, 8 and 9, there is illustrated a control for the rotation $R_1$ by means of a unit 100. This includes a body 101 which houses a double-acting pneumatic cylinder 102 which carries a rack 103 with which a pinion 104 meshes. This latter is mounted on bearings and projects axially from the body 101 and carries an attachment flange 105. The pinion 104 is axially pierced to allow the passage of connections to other components. Monitoring of the rotary movement takes place only at the end of the stroke using two proximity sensors 110.

Figure 10:
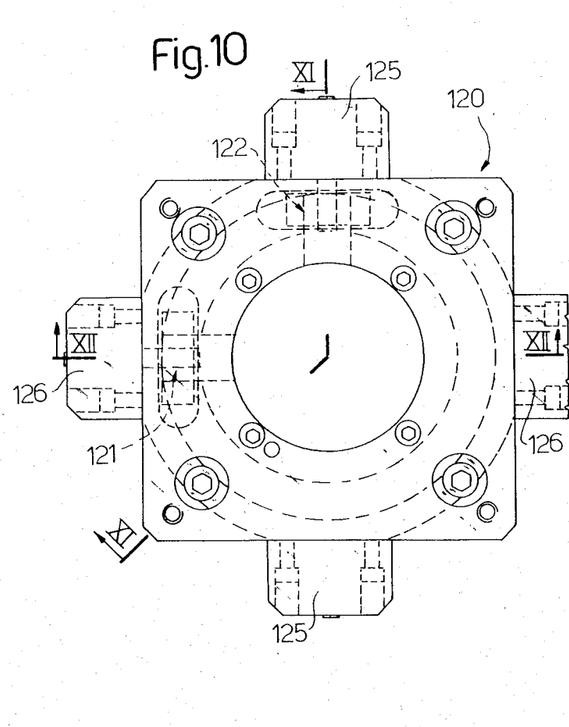
FIG. 10 is a front view of a force sensor which can be fitted to an end of the arm of FIG. 1.
Figure 11:
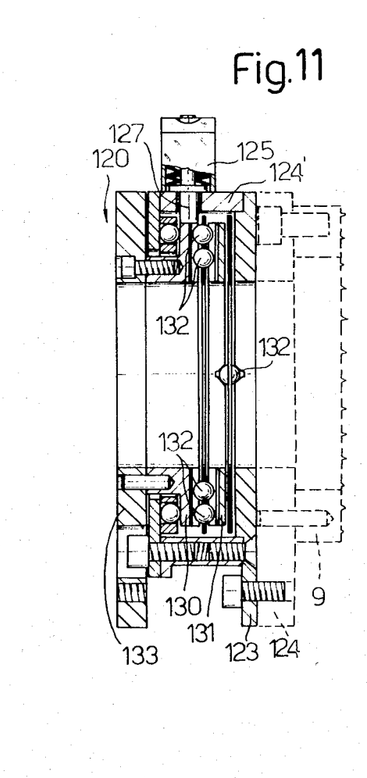
FIGS. 11 and 12 are sectioned views taken on the lines XI—XI and XII—XII respectively of the force sensor of FIG. 10.
Figure 12:
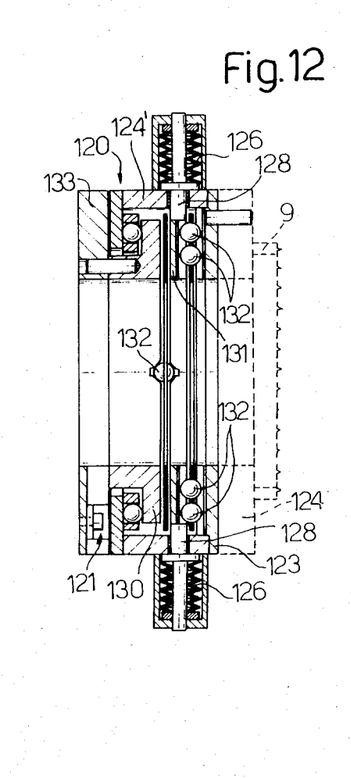
Figures 13, 15:
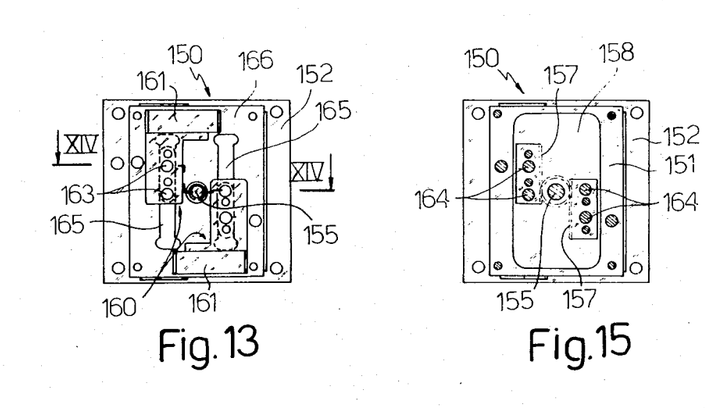
FIG. 13 is a front view of a gripper end for the arm of FIG. 1.
FIGS. 15 and 16 are sectioned views respectively taken on the lines XV—XV and XVI—XVI of the end of FIG. 14.
Figure 14:
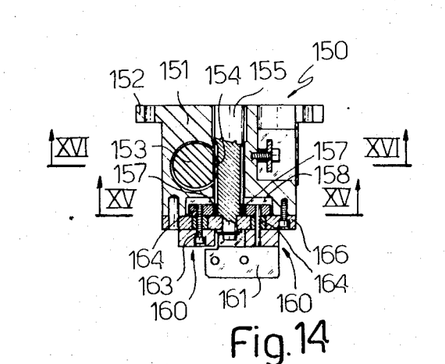
FIG. 14 is a sectioned view taken on the line XIV—XIV of the gripper end of FIG. 13.
Figure 16:
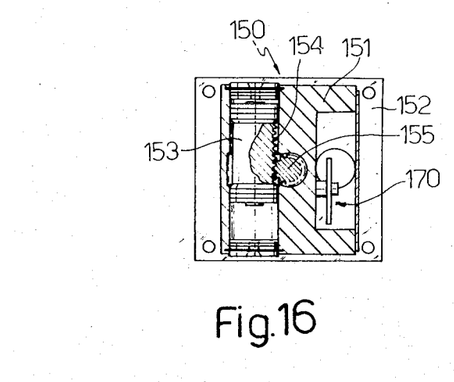
Figure 17:
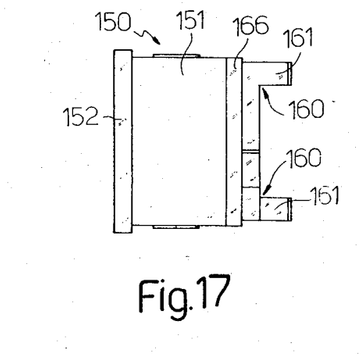
FIG. 17 is a side view of the gripper end of FIG. 13.

In the attachment of the head 3 there can conveniently be interposed a force sensor 120 (FIGS. 10, 11 and 12) able to evaluate the mounting forces due to unforeseen interferences and anomalous forces from incorrect assembly of components. The force sensor comprises a device sensitive in two directions (z and x) comprising a double slide the displacements of which are read by a respective inductive resistor 121 and 122. In particular the sensor 120 comprises a flange 123 connectable to an end flange 124 of the column 9, and which rigidly carries an outer cylinder 124' on which are two counterposed pairs of resilient stack elements 125 and 126 which exhibit a resilient action, which can be calibrated in mounting cups, on small pistons 127 and 128 respectively lying along the z and x axes. These pistons 127 and 128 pass through the cylinder 124' and respectively engage on circular plates 130 and 131 which are coaxially connected by means of balls 132 housed in respective acute angled cavities, and the outer plate of which is connected to an outer flange 133 for connection to the head 3. When a force is applied to the head 3, a relative displacement takes place between the flanges 133 and 123 against the action of the resilient elements 125 and 126 and this displacement is detected by the inductive resistors 121 and 122 connected to detect such variations in the relative positions of the elements.

The head 3 constitutes the element which is specific to the application of the unit. It can be a pincer to perform assembly operations or it may be a measurement head. A common type of pincer is illustrated in FIGS. 13 to 17 and generally indicated 150. This comprises a body 151 which has a rear flange 152 for attachment to the horizontal column 9, and within which there is housed a double acting pneumatic cylinder 153 which carries a rack 154 which meshes with a pinion 155, which latter, in a forward region, meshes on opposite sides with two racks 157 which are housed in a space 158. To the front of these racks 157 there are fixed two gripper elements 160 which are in the form of an L with a base portion 161 (one opposite the other) projecting forwardly whereby to constitute two gripping fingers. These elements 160 are fixed to the racks 157 by means of two screws 163 which carry respective bodies 164 which slide in guide slots 165 formed in a forward plate 166 of the pincer 150. The pincer 150 is therefore able to pick up workpieces, for example cylinders, from the inside or from the outside by varying the distance between the gripping fingers 160 under the action of the pneumatic cylinder 153. The two gripping fingers 160 are actuated with a force for example of twelve kg, and their separating stroke is for example 30 mm, the movement being parallel, simultaneous and self centering. A position transducer 170 of known type with an inductive resistance in a mechanical transmission detects the stroke thereby detecting the presence of the workpiece and allowing its dimensions to be known.

The following are several exemplary values of the fundamental mechanical characteristics of the unit:
(A) displacement along the various axes:
  along the x axis: up to 1300 mm
  along the y-axis: up to 300 mm
  along the z axis: up to 250 mm
  rotation $R_1$: 360°
  rotation $R_2$: 196°
  rotation $R_3$: 360°
(B) definition of the displacement:
  along the axes x, y, z: 0.02 mm
  around the rotations: 0.02°
(C) precision (in the absence of mounting forces or carried weights):
  position over the whole field: ±0.25 mm
  position over 100 mm of displacement: ±0.1 mm;
(D) repeatability of positioning at any point arriving from a predetermined direction with a predetermined load within established limits and in the absence of assembly forces: ±0.025 mm.
(E) rigidity of the structure in the most critical conditions (arm completely extended): 0.025 mm per kg;
(F) maximum translational velocity:
  along each axis x, y, z: 40 meters/minute
  around each rotation $R_1$, $R_2$, $R_3$: 90° per second;
(G) maximum supportable weight at maximum velocity: 2.5 kg.

Figure 18:
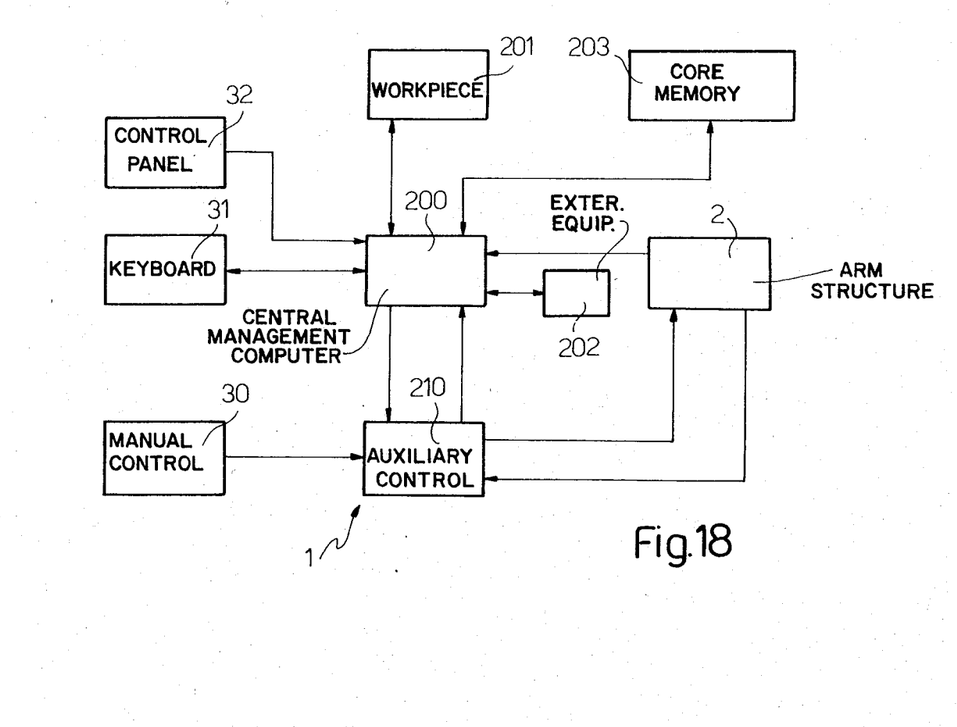
FIG. 18 is a block schematic diagram of the computer system of the unit of FIG. 1.

The computer system 1 for control of the unit comprises (FIG. 18) a first central management computer 200 adapted to communicate with the unit by means of the control panel 32, the video keyboard 31 and a block 201 for the manual control of equipment 202 (for example operating stations or workpiece supply stations supplying workpieces to the unit). The central computer 200 is also adapted for the management of the external equipment 202 by means of input and output members, for the reception of information from the sensors on the arm 2, and for general supervision. The system also includes a second computer 210 specifically adapted for the control and checking of the movement along each individual linear and rotary axis of the arm 2, under the supervision of the central computer 200 by means of "on line" connection therewith. The box 30 for the manual control of the arm 2 is therefore connected to the computer 210. The central computer 200 includes a microprocessor, for example of the type LSI 11, and the computer 210 includes a microprocessor, for example of the INTEL 8080 type.

Figure 20:
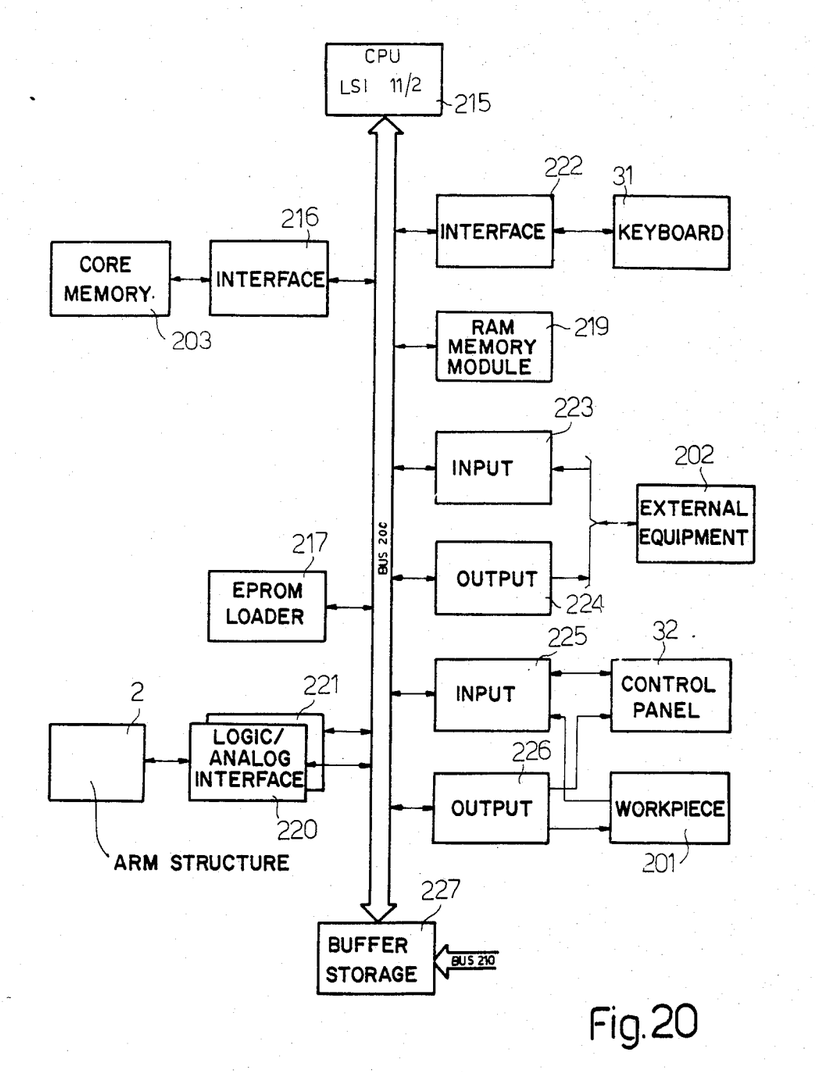

The computer 200 comprises the following modules (FIG. 20) connected to an associated BUS:
(a) CPU Block 215;
(b) interface block 216 interfacing with the core memory block 203;

(c) EPROM LOADER block 217 for loading the programs from the core memory 203 to a RAM memory module 219;

(d) logic and analogue interface blocks 220 and 221 interfacing with the sensors of the arm 2;

(e) interface block 222 interfacing with the video keyboard 31;

(f) logic and analogue input and output blocks 223 and 224 for the fixed and movable equipment 202 with additional units in dependence on the necessity for input and output to the control panel 32 and the block 201 for manual control of the equipment 202;

(g) buffer storage block 227 for connection with the BUS of the computer 210.

The control panel 32 includes three separate sections:

(a) a "power" section with a warning push button for starting the unit, a push button for switching off the unit, and an emergency push button for disabling the unit while leaving it switched on;

(b) a "cycle" section with push buttons for starting and stopping the operating cycle, for continuing the cycle step by step, for stopping the unit after completing the working cycle and for zeroing the position of the unit;

(c) a "selectors" section for selecting control of the unit by the computer 1, manual control of the arm 2 by the box 30, and for changing the working speed of the arm 2.

Figure 19:
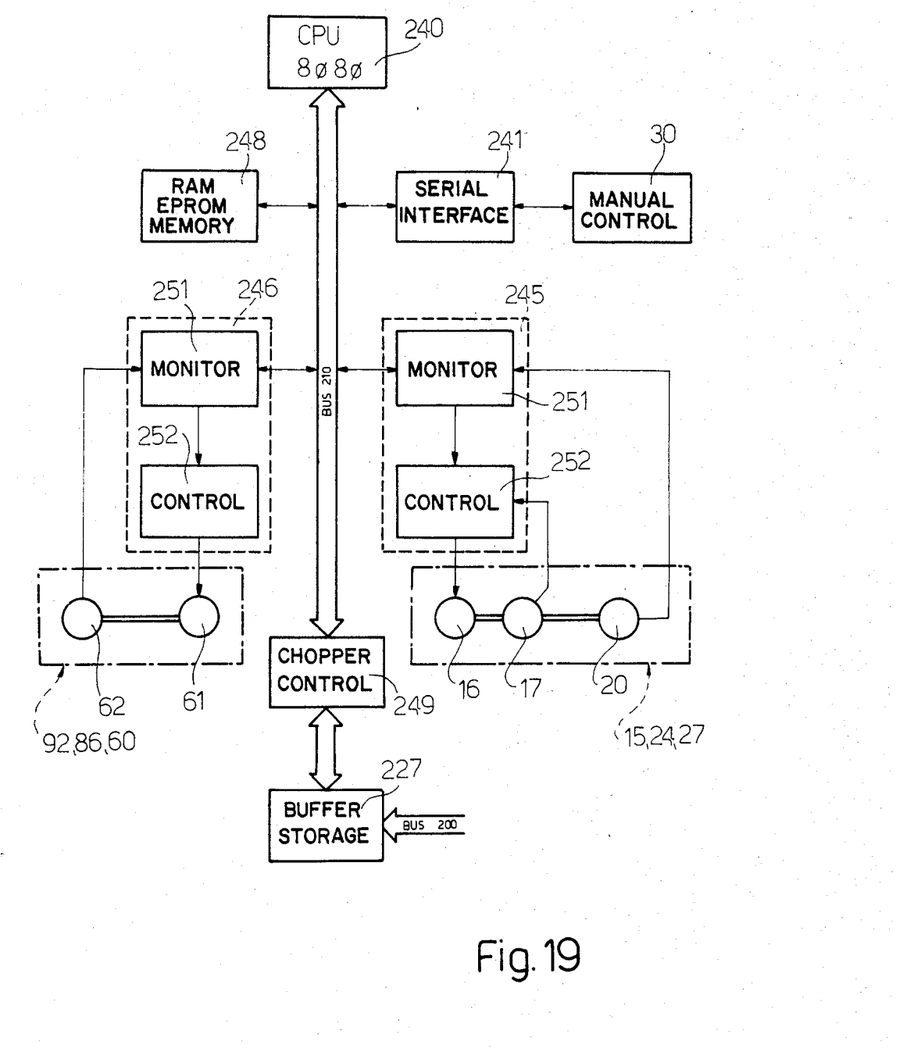
FIGS. 19 and 20 are block schematic diagrams in greater detail of the arrangement of FIG. 18.

The computer 210 includes the following modules (FIG. 19) connected with an associated BUS:

CPU block 240;

serial interface block 241 for the box 30 for manual control of the arm 2; in particular this includes the following main elements:

a lever for controlling movement of the arm 2 along the x and y axes;

a lever for controlling the movement of the arm along the z axis and about one of the available rotations ($R_1$, $R_2$, $R_3$) according to the position of a three position rotary selector;

a data acquisition push button with incorporated warning lamp;

an acoustic indicator;

a three position rotary selector which, when moved to the left, in an anti-clockwise sense, enables the movement along the z axis; in the central position enables the first rotation; and when moved to the right in the clockwise sense enables the second rotation;

control and monitoring blocks 245 for the linear displacements of the arm 2 along the axes x, y and z;

control and monitoring blocks 246 for the rotations $R_1$, $R_2$ and $R_3$ of the arm 2;

RAM EPROM memory blocks 248:

a "chopper" control block 249 with a triangular wave form for the blocks 245 and 246 for the purpose of obtaining a low power consumption upon control and a rapid frequency response necessary because of the considerable dynamics of the movements.

The blocks 245 and 246 are repeated for each motor unit for the x, y and z axis and the $R_1$, $R_2$ and $R_3$ rotations. Each block 245 includes a monitoring block 251 which receives a signal from the encoder 20 for detecting the absolute position of the head 3 of the arm 2 along the associated axis. On the basis of velocity data provided by the computer program and the signal received by the block 252 from the tacho genertor 17, the block 251 through the block 252 controls the power of the motor 16.

Each block 246 also includes blocks 251 and 252 which, however, do not receive the signal from the tacho-generator 17, which is not provided for in this case. There is a module (not illustrated) for limiting over-voltages, which allows the maximum torque for a motor 16 or 61 to be programmed, by allowing an automatic reduction of the thrust to be obtained in the event of impact with obstacles during the movement.

The general operation of the program, permits an extremely flexible use of the unit and provides the possibility of simple and efficient programming of the operative cycles. A high level programming language supported by a suitable operative system for the control of the various applicable functions, including automatic movements for the execution of the cycles is therefore used.

As far as the general management program is concerned, the orientatable language "HELP 11" is adopted for the microprocessor 200. As far as the program for control of the movements is concerned, there are sub-routines for controlling movement along each axis. The program therefore controls simultaneously movements along the linear axes x, y, z and rotational axes $R_1$, $R_2$ and $R_3$ with control of the point-to-point type and controlled acceleration and deceleration. Position and/or force sensors can be used; and in the event of the absence of the workpiece and/or of the achievement of a predetermined threshold value, alternative segments of the program can be activated for performing recovery or discharge cycles and for indicating to the operator.

The data necessary for the user program are usually provided through a self-teaching phase. In this way, the coordinates of the significant points are learned, such as points for picking up and depositing workpieces as well as the values of the sensors (dimensions of the workpiece to be manipulated for example). The user program is stored in the core memory 203 and is automatically transferred to the memory of the computer 200 upon switching on. The program in the unit makes available to the user two separate operating modes: the first can be generally called program preparation while the second can be generally called program execution. After the necessary starting up procedure, the operative system of the unit puts itself into one of the two modes in dependence on the position of the switch, utilizing two different programs residing in the permanent EPROM working memory.

There is, moreover, a program for the purpose of permitting the detection of possible defects and malfunctions in the various elements. The possibilities for such detection are divided into two distinct operating stages:

(a) a first general system program intended to indicate malfunctioning of the main functional units: motor unit 15,24,27,92,86,60, control panel 32, equipment control panel 201, manual lever box 30, print out terminal 31;

(b) a specific system program comprising an effective test of the operation of individual modules, with the possibility of identifying the malfunctioning blocks within the module.

There are substantially three possible modes of operation of the unit: automatic, self-teaching and manual.

In the automatic mode, it is necessary to have available a program already prepared for the cycle. Functioning in this way is actuated from the control panel 32 and allows the operator several types of intervention through the use of push buttons or selector switches.

Self-teaching takes places when there is available a self-teaching guide program, and it is desired to make variations to the coordinates of the points of the cycle and/or to the reference values for the sensors. In this operating mode it is necessary to make use of the box 30 and the terminal 31 for effecting the communication between the operator and the unit. The manner in which the self-teaching progresses depends on the program which has been written. In any case it is possible to move the carriages of the arm 2 one at a time by means of the use of the box lever 30 and to memorize, by means of a suitable push button, the data of interest.

In manual operation there is no program and, in this mode of operation, it is possible to use the control panel 32, the lever box 30 or the device 201 for manual control of the equipment.

Having completed the analysis of the problem the program can be written and introduced into the core memory 203. The program corresponding to the operating cycle can, at this point, be compiled and transferred into the working memory, and if there are data to learn, the learning program can be followed. The conditions achieved are now:

presence in the main memory 219 of the operating cycle program;

presence in the core memory 203 of the data set up program.

Both these conditions are necessary so that the setting up program and subsequently the operating cycle can be followed. Since the working memory 219 is of the volatile type, it is necessary, each time the machine is switched on, to proceed by way of compilation of the cycle program subsequently transferring it into the memory and executing the data set up program before launching into the cycle itself.

As will be seen from what has been described, the structure of the unit comprises the arm 2, its optional parts (the working or measuring end head 3, motor units 60,92 and 86 for effecting the rotations $R_1$, $R_2$ and $R_3$, force sensor 120) and by the support element 6 on which the arm 2 slides.

The basic mechanical module is the structure of the arm 2 with the carriages 4 and 8 and the columns 5 and 9 respectively slidable within these carriages 4 and 8. The arm 2 is not tied to any fixed position, but is movable on a main guide (support element 6) which can be fixed to any fixed support, conveniently a support bed 7, in dependence on the operating requirements. On the arm structure 2 there can optionally be mounted up to two units for providing the $R_1$ rotation of the end head 3 and the pivoting in a horizontal ($R_3$) or vertical ($R_2$) plane.

The mounting of the units to obtain the said rotations is effected in an extremely simple and rapid manner. If only a single rotation is provided for, any of the three units illustrated in FIG. 5 can be mounted on the arm.

In fact, it is possible easily to connect to the front end of the column 9 a unit which replaces the flange 71 rotating about $R_1$ which transforms, by means of a pair of bevel gears, the $R_1$ movement into $R_2$ or $R_3$.

As is illustrated in FIG. 6, the $R_2$ or $R_3$ rotations can be obtained with two associated motor units 92 and 86 which can be mounted on the front flange 71 which, in its turn, may or may not be driven by means of the motor unit 60 to provide the $R_1$ rotation. If only the $R_2$ or $R_3$ rotations are necessary, this can therefore be obtained with drive from the rear by means of the motor unit 60, or with drive from the front by means of the associated motor units 92 and 86.

The construction of the carriages 4 and 8 of suitably reinforced aluminium alloy allows a unit of limited weight (preferably less than 40 kg) with considerable dynamic performance and a good positioning precision to be obtained. The use of prismatic guides for the columns 5 and 9 made of steel tube, enables a significant static rigidity with limited weight to be obtained.

The unit can be provided with gripping members having sensors, specially shaped to deal with the parts to be manipulated, or made more generally for the manipulation of several parts, the form and dimensions of which are similar. It is therefore adapted to be used both for long mass production runs, because the arm 2 is rapid, agile and light and therefore guarantees high productivity, and for medium size production runs or batch production because the programmability and adaptability of the unit guarantees the possibility of being able to operate on different products and with different cycles. Furthermore, production is sophisticated and of high quality because the precision and repeatability of the arm 2 and the sensitivity of the pincer 150 and the force sensor 120 ensures quality and precision in the assembly and a low precentage of reject products.

The structure of the unit of the present invention is further advantageous by the fact that all the operations are performed along the three linear cartesian axes x, y, z. There is simplicity of control (non-continuous), there is a variable and minimum number of controlled axes (up to three) there is a greater precision in rectilinear movement obtained by the sliding of individual columns within respective single carriages, there is greater rigidity and precision with respect to arrangements of the cylindrical or articulated type, and there is a functional distinction between the support (provided by the low friction rollers for the x and y axes or by the balancing device for the z axis) and movement (which is provided by motor units which must therefore overcome only the friction and the intertia).

The adoption of modular arrangements, both at the mechanical and the electronic level, allows the configuration of specific units which nevertheless retain the possibility of being extended and easily adapted to possible future modifications. It is therefore possible to obtain in all circumstances the most convenient solution for satisfying the operational requirements with respect to the most convenient organizational structure for the convenient orientation of the utilizer. The configurations of the unit can differ significantly from one another in the structure of the arm 2 and the number and type of sensors used (force sensors 120 along one or both of the x and z-axes and position sensors in the pincers 150 etc.,) as well as in the type of gripping members. The processor unit 1, arranged in a cabinet, is able to follow the simultaneous movements along the x, y and z axes and the rotations $R_1$, $R_2$ and $R_3$, to supervise the sensors 120 and the pincers 150 and to cope therefore with the overall requirements of the application. The operations required for a given application determine the number of degrees of freedom which can normally vary in the unit between three and five. Moreover, taking account of the modularity, the unit can be formed in various configurations utilizing the same elements and with a degree of integration such as to reduce the number of components.

The unit described is characterized by constructional modularity and flexibility in use. It has limited dimensions and bulk (the columns 9 being contained within the carriages and the balancing device being contained within the column 5) and, it can be conveniently used in the fields of assembly, for coupling and inserting with precision, selective taking up and deposition, and for other technological operations typical in the assembly of components of small dimensions, or for dimensional measurements.

Finally, it is clear that the described and illustrated embodiments of the invention can be modified and varied without departing from the scope of the invention itself; for example, the computers 200 and 210 could be replaced by a single computer.

We claim:

1. A computer controlled robotic arm unit comprising:
   a fixed body,
   a carriage,
   first axis moving means for linearly moving said carriage to said fixed body along a first and substantially horizontal orthogonal cartesian axis,
   an elongated column,
   second axis moving means for vertically moving said column to said carriage along a second and substantially vertical cartesian axis,
   an arm carried by said column, said arm having a work performing member at one end,
   third axis moving means for linearly moving said arm along a third and substantially horizontal orthogonal cartesian axis, said third axis being perpendicular to said first axis
   wherein said second axis moving means comprises an electric motor, and comprising means for maintaining a substantially constant load on said electric motor.

2. The invention as defined in claim 1 and comprising a motor carried by said arm and means detachably connected to said motor for rotating said work performing member around any two user selected rotational orthogonal cartesian axes.

3. The invention as defined in claim 1 and comprising at least one guide element for each axis, and wherein each moving means comprises a motor unit.

4. The invention as defined in claim 3 wherein each motor unit is electrically powered and wherein the electrical supply to said motor units is obtained by means of flexible flat conductor supporting strips.

5. The invention as defined in claim 1 and comprising rotary displacement means for allowing a rotation of said work performing member about at least one axis coinciding or parallel to one of the said group of three orthogonal cartesian axes.

6. The invention as defined in claim 5 and comprising two rotary displacement means for providing a rotation of said work performing member about two of said cartesian axes.

7. The invention as defined in claim 6 wherein said rotary displacement means comprises a single motor for rotation of said work performing member about two axes.

8. The invention as defined in claim 1 and comprising a force sensor responsive to movement of said work performing member along at least one axis.

9. The invention as defined in claim 1 wherein said work performing member comprises a pincer.

10. The invention as defined in claim 9 wherein said pincer includes two jaws, the movement of which are pneumatically controlled by a double-acting cylinder.

11. The invention as defined in claim 9 and comprising a position transducer carried by said pincer.

12. The invention as defined in claim 1 and comprising a computer system having a first computer for control of operations external to said arm, and a second computer for the control and monitoring of said moving means.

13. The invention as defined in claim 12 wherein said first computer includes a microprocessor of the LIS 11 type and wherein said second computer includes a microprocessor of the INTEL 8080 type.

14. The invention as defined in claim 12 and comprising an operating control panel operatively connected to said first computer and a device for the manual control of the displacement of said work performing member connected to said second computer.

15. The invention as defined in claim 12 wherein said computer system includes individual monitoring and control blocks connected to said second computer for each of said moving means of said arm, said blocks operating simultaneously with said second computer.

16. The invention as defined in claim 12 wherein said computer system controls the operating of said moving means under automatic conditions, self-teaching conditions and manual displacement conditions.

17. A computer controlled robotic arm unit comprising:
   a fixed body,
   a carriage,
   first axis moving means for linearly moving said carriage to said fixed body along a first and substantially horizontal orthogonal cartesian axis,
   an elongated column,
   second axis moving means for vertically moving said column to said carriage along a second and substantially vertical cartesian axis,
   an arm carried by said column, said arm having a work performing member at one end,
   third axis moving means for linearly moving said arm along a third and substantially horizontal orthogonal cartesian axis, said third axis being perpendicular to said first axis, and
   a motor carried by said arm and means detachably connected to said motor for rotating said work performing member around any two user selected rotational orthogonal cartesian axes.

18. A computer controlled robotic arm unit comprising:
   a fixed body,
   a carriage,
   first axis moving means for linearly moving said carriage to said fixed body along a first and substantially horizontal orthogonal cartesian axis,
   an elongated column,
   second axis moving means for vertically moving said column to said carriage along a second and substantially vertical cartesian axis,
   an arm carried by said column, said arm having a work performing member at one end,
   third axis moving means for linearly moving said arm along a third and substantially horizontal orthogonal cartesian axis, said third axis being perpendicular to said first axis,
   at least two rotary displacement means for allowing a rotation of said work performing member about at least two axles parallel to two axes of the said group of three orthogonal cartesian axes, and
   wherein said rotary displacement means comprises a single motor for rotation of said work performing member about two axes.

19. The invention as defined in claim 18 wherein said rotary displacement means is pneumatically actuated.

* * * * *

UNITED STATES PATENT AND TRADEMARK OFFICE
CERTIFICATE OF CORRECTION

PATENT NO. : 4,534,006
DATED : August 6, 1985
INVENTOR(S) : GIORGIO MINUCCIANI

It is certified that error appears in the above-identified patent and that said Letters Patent is hereby corrected as shown below:

Column 4, line 22 after "wheel" delete "65" and insert --64--.

Signed and Sealed this

Twenty-second Day of October 1985

[SEAL]

Attest:

DONALD J. QUIGG

Attesting Officer

Commissioner of Patents and
Trademarks—Designate